Patented Mar. 6, 1923.

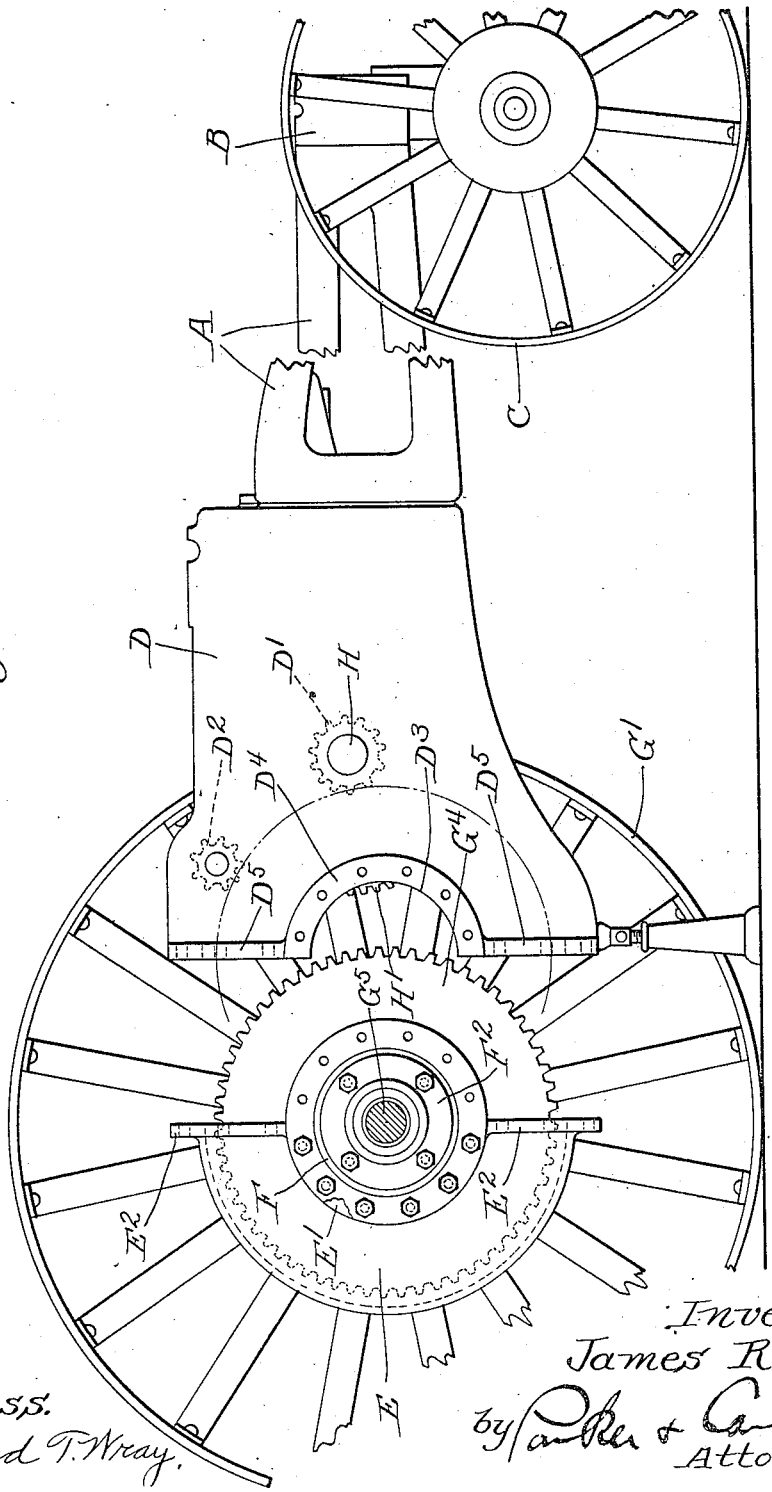

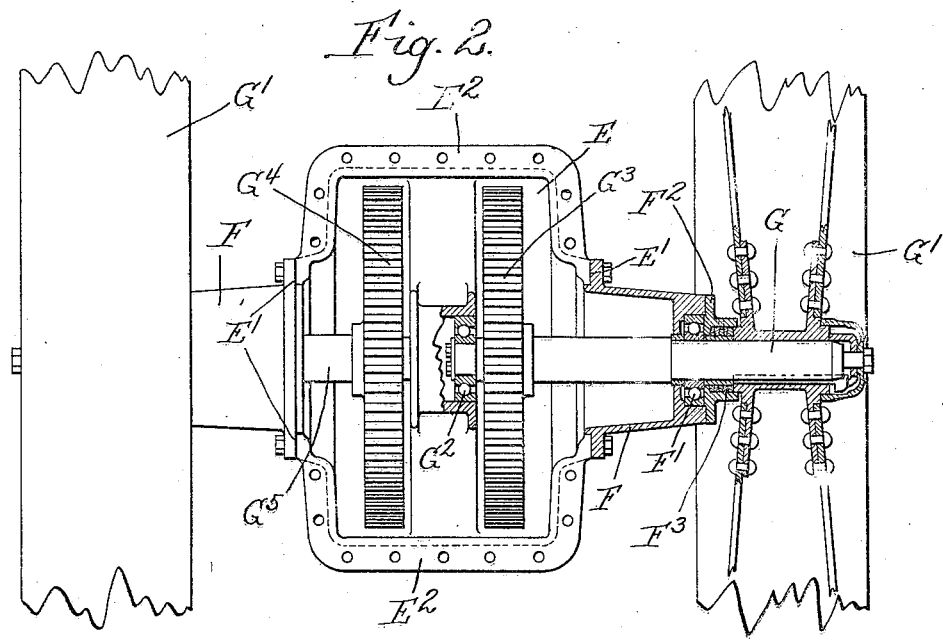
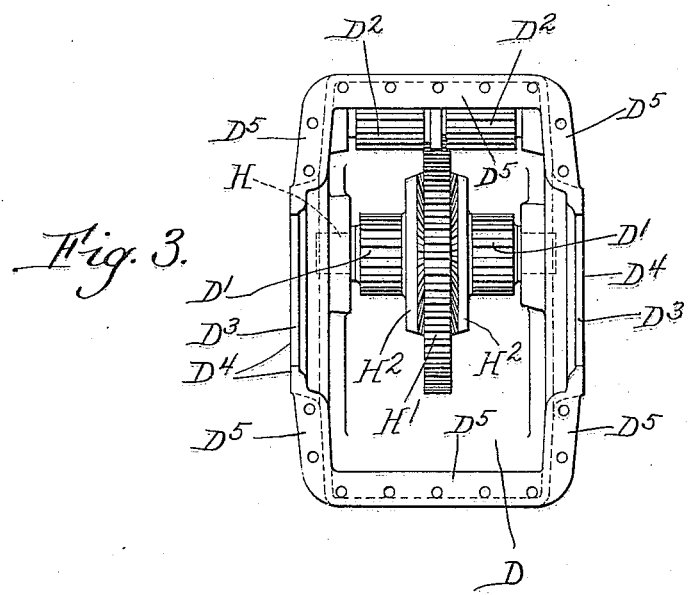

1,447,266

UNITED STATES PATENT OFFICE.

JAMES ROSS, OF LAPORTE, INDIANA, ASSIGNOR TO ADVANCE-RUMELY COMPANY, OF LAPORTE, INDIANA, A CORPORATION OF INDIANA.

TRANSMISSION CASE.

Application filed May 22, 1922. Serial No. 562,576.

*To all whom it may concern:*

Be it known that I, JAMES ROSS, a citizen of the United States, residing at Laporte, in the county of Laporte and State of Indiana, have invented a certain new and useful Improvement in Transmission Cases, of which the following is a specification.

This invention relates to traction engines and particularly to the construction of transmission housing and casing for the same. It has for one object to provide a transmission housing in which the entire rear axle transmission assembly may be made up complete while it is still separate from the rest of the traction engine, so that it may be treated as a unit and the parts assembled and properly lined up and the unit subsequently joined to the forward part of the transmission housing. It has for another object to provide a construction wherein all of the moving parts of the transmission except the wheel can be completely enclosed and be protected from dust. Other objects will appear from time to time throughout the specification and claims.

My invention is illustrated more or less diagrammatically in the accompanying drawings, wherein:

Figure 1 is a side elevation of a tractor with the rear axle assembly in position to be connected to forward part of housing;

Figure 2 is an elevation of the open side of the rear part of the transmission housing looking rearwardly;

Figure 3 is an elevation of the open side of the forward part of the transmission housing looking forward.

Like parts are designated by like characters throughout.

A is one of the side members of the tractor frame. B is a front member joining the two side members. C is one of the front wheels. D is the forward part of the transmission case, within which are mounted the master or engine pinions D', D' and the lock pinions $D^2$, $D^2$. This forward section of the transmission case is provided with the semi-circular openings $D^3$, $D^3$ which are surrounded by flat portions $D^4$, $D^4$ in which perforations for holding screws are formed. Joining the portions $D^4$ and extending vertically up and out from their ends are a pair of laterally extending flanges $D^5$, $D^5$.

E is the rear section of the transmission case. It is semi-circular in side elevation as shown and it is provided with flat portions E', E' similar to the portions $D^4$ described above. It has also a pair of flanges $E^2$ similar and adapted to mate with the flanges $D^5$.

Secured to the rear half of the transmission case upon the flat portions E' are a pair of hollow bearing supported axle housings F. One of these housings is shown in section in Figure 2. As they are shown they are provided with the ball bearing F'. Beyond this there is a removable axle housing cover $F^2$ which is provided with suitable packing $F^3$. Extending through this bearing and supported in part by it is one of the stub shafts G. To the outer end of the shaft is fixed one of the driving wheels G'. The axle is supported as at its inner end on a second ball bearing $G^2$ which is mounted within the casing. Adjacent this bearing and fixed upon the shaft is one of the master driven gears $G^3$. A similar gear $G^4$ is mounted on a similar stub shaft $G^5$, the mounting and support of which is the same as that just described in connection with the shaft G.

Referring now to Figure 3, H is a shaft upon which are mounted two master pinions D', D'. H' is a differential spur gear rotatably mounted on the shaft H. It is driven from the engine in a manner not here shown. $H^2$ $H^2$ are differential beveled gears adapted to rotate with the master pinions D', D' and to mesh with the differential beveled pinions mounted on the differential spur gear. The construction of these parts is well known and is not here shown in detail as it forms no part of the present invention.

The lock pinions $D^2$, $D^2$ are adapted to mesh with each of the master gears $G^3$, $G^4$ and they may be manipulated to lock these gears against relative movement. Their operation is not illustrated in detail and will not be described as it forms no part of the present invention.

The use and operation of this invention are as follows:

The rear half of the transmission case is assembled with the axle housings and the bearings which they carry. The stub shafts and the gears joining them and the driving wheels are all then assembled to form a complete rear axle unit, the parts being assembled so that the rear axle unit is complete and particularly assembled separate from the rest of the tractor which is itself separately assembled. When the two assemblies are complete the parts are as shown in Figure 1. The rear end of the forward transmission case may be supported by a jack or any suitable manner and then the entire rear axle unit is rolled forward into position. The pairs of laterally extending flanges on the transmission case are bolted together and the axle housings are screwed to the forward half of the transmission case and the assembly is complete.

For the purpose of repair and inspection the parts may be separated in obvious manner and by means of the construction of this invention the original assembly of parts is greatly facilitated and subsequent repair or replacement is also correspondingly facilitated.

I claim:

1. In a tractor a two part transmission case including one part attached to the forward frame members in combination with a second part including the rear axle assembly.

2. In a tractor a two part transmission case including one part permanently attached to the forward frame members in combination with a second part including the rear axle assembly.

3. In a tractor a two part transmission case including one part attached to the forward frame members in combination with a second part including the entire rear axle assembly.

4. In a tractor a two part transmission case including one part permanently attached to the forward frame members in combination with a second part including the entire rear axle assembly.

5. In a tractor a two part transmission case including one part attached to the forward frame members in combination with a second part including the rear axle assembly, each of the two parts of said transmission case including members of the driving transmission, said members adapted to mesh with each other when the two parts of the transmission case are secured together.

6. In a tractor a two part transmission case including one part permanently attached to the forward frame members in combination with a second part including the rear axle assembly, each of the two parts of said transmission case including members of the driving transmission, said members adapted to mesh with each other when the two parts of the transmission case are secured together.

7. In a tractor a two part transmission case including one part attached to the forward frame members in combination with a second part including the entire rear axle assembly, each of the two parts of said transmission case including members of the driving transmission said members adapted to mesh with each other when the two parts of the transmission case are secured together.

8. In a tractor a two part transmission case including one part permanently attached to the forward frame members in combination with a second part including the entire rear axle assembly, each of the two parts of said transmission case including members of the driving transmission, said members adapted to mesh with each other when the two parts of the transmission case are secured together.

9. In a tractor a two part transmission case including one part attached to the forward frame members and containing a part of the transmission in combination with a second separable part including the entire rear axle assembly.

10. In a tractor a two part transmission case including one part fixedly attached to the forward frame members and a second separable part adapted to be attached thereto, said second part including the rear axle, bearings for supporting said axle and means for driving said axle, and comprising with such parts the complete rear axle assembly.

11. In a tractor a two part transmission case including one part attached to the forward frame members and containing a part of the transmission including driving pinions, in combination with a second part including the entire rear axle assembly including a pair of stub shafts each having a driving wheel at its outer end and a gear on its inner end adapted to mesh with and be driven by said driving pinions, and bearings for said stub shafts.

12. In a tractor a frame formed in part of a transmission case and in part of additional frame members, said transmission case formed in two separable parts one attached to said frame members and the other including the entire rear axle assembly.

13. In a tractor a frame formed in part of a transmission case and in part of additional frame members, said transmission case formed in two separable parts one attached to said frame members and the other including the entire rear axle assembly, comprising a pair of stub shafts each having a driving wheel at its outer end and a gear on its inner end and bearings for supporting such shafts.

14. In a tractor, a transmission case, a main frame formed in part of the transmission case and in part of additional side frame members, the transmission case being formed in two separable parts including one part attached to the frame members in combination with the second part including the rear axle assembly.

15. In a tractor, a transmission case, a main frame formed in part of said transmission case and in part of additional frame members, said transmission case formed in two parts including one part permanently attached to the frame members in combination with the second of the two parts, said transmission case enclosing members of the driving transmission, said members adapted to mesh with each other when the two parts of the transmission case are secured together.

16. In a tractor, a transmission case, a transmission therein, a main frame formed in part of said transmission case and in part of additional frame members, said transmission case being formed of two main separable parts, one attached to said frame members and enclosing the differential and a pair of driving pinions, the other part including a pair of stub shafts, each having on its outer end a driving wheel and on its inner end a gear and including means for holding bearings for the inner end of said stub shaft and being mounted in said means.

Signed at Laporte, county of Laporte, and State of Indiana, this 17th day of May, 1922.

JAMES ROSS.